UNITED STATES PATENT OFFICE.

DAVID H. BLAKE AND JERAMIAH P. RAY, OF SAN ANTONIO, TEXAS.

COMPOSITION PULP PLASTER AND PROCESS OF MANUFACTURING SAME.

SPECIFICATION forming part of Letters Patent No. 624,446, dated May 9, 1899.

Application filed February 3, 1899. Serial No. 704,344. (No specimens.)

*To all whom it may concern:*

Be it known that we, DAVID H. BLAKE and JERAMIAH P. RAY, citizens of the United States, residing at San Antonio, in the county of Bexar and State of Texas, have invented a new and useful Composition Pulp Plaster and Process of Manufacturing Same, of which the following is a specification.

Our invention relates to a composition pulp plaster designed as a substitute for ordinary lime-plaster and equivalent materials and particularly adapted for use in warm moist climates, where the ordinary lime-plaster lacks durability and is rendered non-adherent.

A further object of the invention is to provide a cheap substitute for plaster which will be not only waterproof, but also fireproof and gas-proof or practically impervious to air.

The materials which enter into the composition of matter to which our invention relates are bagasse, glue, asbestos, alum, and sugar of lead, and also (when it is desired to reduce the quantities of alum and sugar of lead) sunflower-pulp, (helianthus.)

The efficiency of the composition for the purposes for which it is designed depends, however, not only upon the proportions of the ingredients, but upon the method of combining them, and although the composition may be formed without the use of sunflower-pulp we have found it to be an advantage to use said pulp for the reason, first, that it may be used in lieu of a portion of the alum and sugar of lead which otherwise would be necessary, and, second, that its fibrous structure increases the bulk of the composition, while the natural gum thereof forms a binding agent to assist the glue in producing a tough fire and gas proof substance.

In order that the merits of our invention may be fully understood, we will describe the preferred process of manufacturing the same and will indicate the preferred proportions of the several ingredients thereof as follows: Of a ton of bagasse (the dry refuse of cane from cane-mills) and sunflower-pulp (which may include the stalks, flowers, and other parts of the plant) we preferably use three parts of bagasse to one of sunflower-plant, both of these materials being of fibrous quality, but the sunflower-plant also including a gum which we find of particular advantage in connection with the composition of matter, as will be hereinafter explained in detail. The fibrous materials named are first ground and macerated and intermixed, after which they are preferably placed in a vat or tank, and to one ton of the mixture (dry) is added twenty-five pounds of saleratus. The mixture of pulps is then exposed to steam at a pressure of approximately one hundred and twenty-five pounds, and during its exposure to the steam the mixture is thoroughly agitated, so that all parts thereof may come in contact with the saleratus and steam. The object of this step in the process is to soften the gums of the vegetable substances and thoroughly cleanse the fibers, the steam and saleratus acting in conjunction for this purpose. After the steaming process has continued for approximately twelve hours the pulp should be thoroughly washed by flowing water into the receptacle in which the pulp is arranged and agitating the pulp, whereby acids and dirt or other substances foreign to the fiber and gums of the materials, together with the saleratus, may be completely removed. To the washed pulp is now added glue, ten pounds, and asbestos, one hundred pounds, the glue being dissolved before addition to the mass and both the glue and the asbestos being thoroughly mixed with the pulp to cause an even distribution thereof throughout the mass. Subsequent to the thorough mixing of the glue and asbestos we add alum, ten pounds, and sugar of lead, ten pounds, said alum and sugar of lead having previously been dissolved, preferably in hot water, and again the mass should be thoroughly stirred or agitated to insure the proper mixing of the several ingredients.

While kept in bulk, and thus in a moist state, the composition comprising the above-named ingredients will remain in condition to be applied to a wall, ceiling, or other surface for an indefinite length of time; but upon applying the composition more or less thinly to a surface its exposure to the air will result in a comparatively rapid drying thereof, it having been found in practice that the length of time necessary to insure the complete drying and hardening of the composition, as above indicated, is much less than that required for ordinary lime-plaster.

As will be understood from the foregoing description, the body ingredient of the composition consists of the bagasse, supplemented (when used) by the sunflower-pulp, but that, while the alum and sugar of lead are employed as fire and gas proofing ingredients, the alum also serving to harden the material when applied, a less quantity of these last-named materials may be used when the sunflower-pulp is employed, for the reason that sunflower-pulp contains a gum having hardening and fireproofing properties. Furthermore, the sunflower-gum adds to the adhesive quality of the composition and constitutes an additional binding agent to supplement the action of the glue.

As above indicated, the function of the saleratus, which does not enter into the composition, but must be thoroughly washed out before the addition of glue, is that of a cleansing agent, in connection with steam, to insure an intimate commingling of the fibers and gum composing the bagasse and sunflower-pulp.

The glue obviously performs the function of a binding and also an adhesive agent, while the asbestos forms a fireproof and heat-nonconducting element. It should be noted that the glue must be added to the cleansed pulp and thoroughly mixed therewith prior to the addition of the alum, as a satisfactory distribution of the glue throughout the mass cannot be attained subsequent to the addition of alum or when the alum and glue are added simultaneously to the mass, owing to the fact that the alum serves to congeal or stiffen the glue.

In practice the composition embodying our invention is applied and finished precisely as are any other of the plasters now in common use to laths, boards, stone or brick, metal, or any other surface, and it may be worked to form a surface suitable for the application of wall-paper without the addition thereto of sizing, as is required in connection with ordinary lime-plaster. The last-named advantage of the improved composition is due to the fact that while of a fibrous quality it is of close texture and is practically non-porous, hence being impervious to moisture and gases, as well as being unaffected in physical properties thereby.

A further and important advantage of the composition pulp plaster resides in the fact of its lightness, and hence the small strain applied thereby to laths in connection with which it may be used in the formation of partition and other walls, and when thoroughly dry the composition is hard and tough and at the same time is flexible, and hence it does not disintegrate or crumble, as does ordinary lime-and-sand plaster, and when exposed to strain it will yield without cracking.

The use of hair or the equivalent thereof, which is resorted to in connection with lime-and-sand plaster to prevent cracking, is entirely unnecessary in connection with the composition pulp plaster, for the reason that the fibers forming the body element of the latter constitute an efficient binding agent, said fibers being thoroughly interlaced throughout the mass.

Having described our invention, what we claim is—

1. A composition of matter comprising a pulp of bagasse, glue, asbestos, alum, and sugar of lead, in substantially the proportions specified.

2. A composition of matter comprising a pulp of bagasse and sunflower (helianthus), glue, asbestos, alum, and sugar of lead, in substantially the proportions specified.

3. The process of manufacturing a composition pulp plaster, the same consisting in grinding and macerating bagasse to form a pulp; adding a cleansing and gum-softening agent, and steaming the pulp; then washing the pulp to remove the cleansing agent; then adding and thoroughly intermingling a binding agent and a fireproofing material, as asbestos; and finally adding and thoroughly intermingling a hardening agent, substantially as specified.

4. The process of manufacturing a composition pulp plaster, the same consisting in grinding and macerating bagasse and sunflower-plant (helianthus) to form a pulp; adding a cleansing and gum-softening agent, and steaming the pulp; then washing the pulp to remove the cleansing agent; then adding and thoroughly intermingling a binding agent and a fireproofing material, as asbestos; and finally adding and thoroughly intermingling a hardening agent, substantially as specified.

5. The process of manufacturing a composition pulp plaster, the same consisting in grinding and macerating bagasse, to form a pulp; then adding saleratus, and exposing the same to steam under pressure, the pulp being thoroughly agitated during its exposure to the steam; then washing the pulp to remove traces of acids and saleratus; then adding dissolved glue and asbestos, and thoroughly mixing the same with the pulp; and finally adding a solution of alum and sugar of lead and thoroughly mixing, substantially as specified.

In testimony that we claim the foregoing as our own we have hereto affixed our signatures in the presence of two witnesses.

DAVID H. BLAKE.
JERAMIAH P. RAY.

Witnesses:
JOHN H. SIGGERS,
EDWIN E. VROOMAN.